Sept. 12, 1967   R. D. ALLEN   3,340,819
COUPLING AND PUMP COMBINATION
Filed March 28, 1966
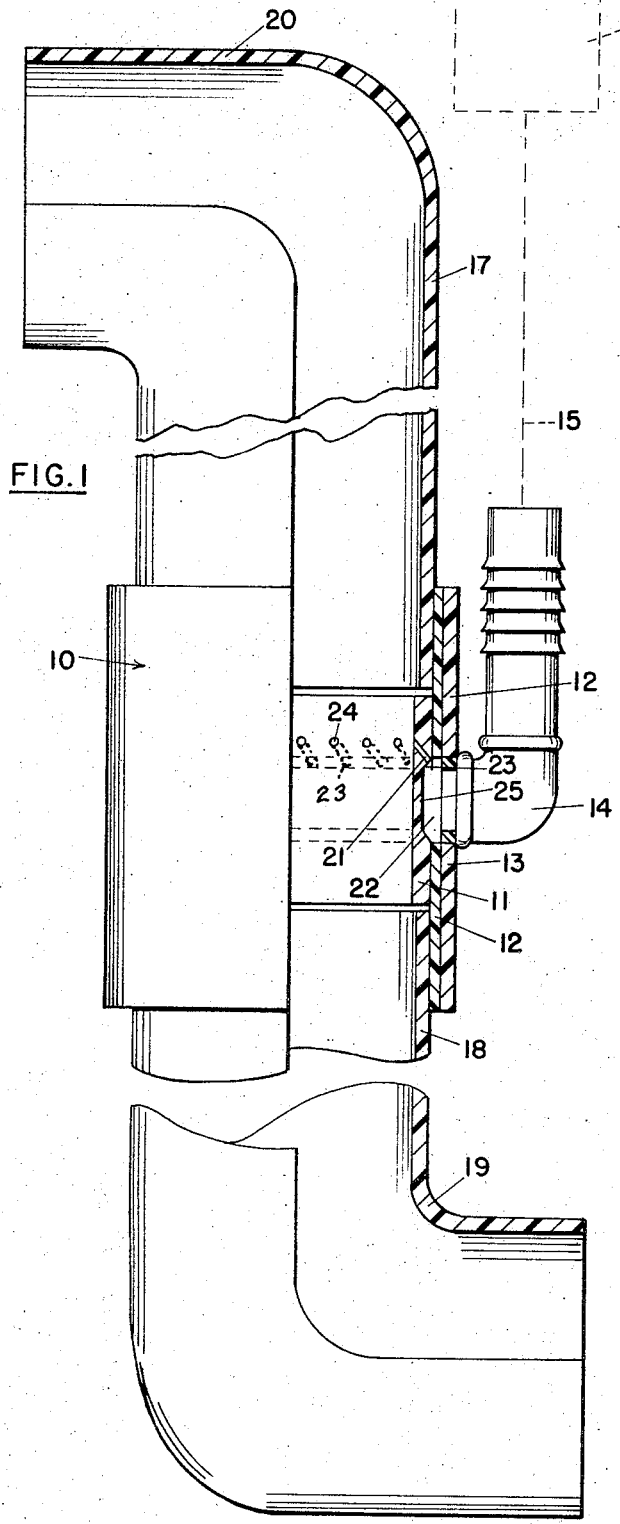
FIG.1
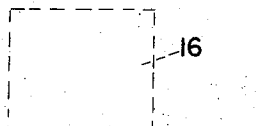
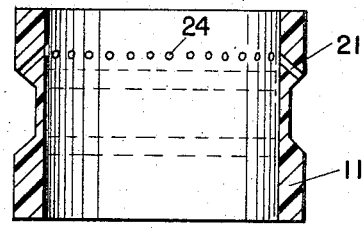
FIG. 2
FIG. 3
INVENTOR
ROBERT D. ALLEN
BY
Charles L. Lovercheck
attorney

United States Patent Office 3,340,819
Patented Sept. 12, 1967

3,340,819
COUPLING AND PUMP COMBINATION
Robert D. Allen, 379 Niles-Cortland Road SE.,
Warren, Ohio 44484
Filed Mar. 28, 1966, Ser. No. 537,890
2 Claims. (Cl. 103—232)

This application is a continuation in part application of patent application Ser. No. 219,532, filed Aug. 27, 1962.

This invention relates to couplings and, more particularly, to couplings in combination with compressed air supplies and in combination with piping to form an air lift pump for aerating liquid waste and the like.

The coupling disclosed herein is suitable for connecting two pieces of pipe that would be disposed vertically in a waste treatment tank for aerating it or for any other use for moving a liquid whether solid laden or not to a position above a liquid level in a container or by gravity aspiration without mechanical moving parts.

The coupling provides a means of inserting the air at a plurality of spaced openings on the inside of the coupling in such a manner that the air enters the coupling in a plurality of spiral paths, flows upward while mixing with a liquid in such a manner as to reduce its specific gravity and cause both to flow upward.

It is, accordingly, an object of the present invention to provide an air lift pump coupling.

Another object of the invention is to provide an improved coupling in combination with pipes and a source of compressed air forming a lift pump.

Still another object of the invention is to provide a lift pump which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is a view partly in cross section of a coupling according to the invention shown in combination with a lift pump;

FIG. 2 is a cross sectional view of the inside member which compriss a part of the coupling; and FIG. 3 is a longitudinal cross sectional view of the split sleeve that comprises a part of the coupling.

Now with more particular reference to the drawing, a coupling 10 is made up of the hollow cylindrical central member 11 which is disposed inside of the two spaced split spacer members 12 sized to fit closely over standard pipe dimensions, which are in turn disposed inside the hollow cylindrical outer member 13. It will be noted that the hollow cylindrical inside central member 11, the spacers 12, and the outside member 13 are disposed in concentric relation and are sealed together forming the coupling. The coupling may be made of a plastic material such as polyvinyl chloride or styrene compounds, or any semi-rigid solvent welded plastic pipe and sealed together by a simple sealing means well known to those skilled in the art.

The central member 11 has an outer circumferential groove therein indicated which forms a part of an enlarged circumferential passage 25 inside the coupling. An elbow 14 is connected to the passage by an opening in the side of the outside member 13 as shown and the elbow 14 is connected through a line 15 to a source of compressed air 16. The upper pipe 17 is coupled and solvent weld cemented into the space formed inside the upper spacer 12 and above the central member 11. The lower pipe 18 is received in an equal space inside the lower spacer 12 and below the central member 11. The lower pipe 18 terminates at the option of the user. The upper end of the pipe 17 also terminates at the option of the user.

Orifices 21 communicate between the annular channel 22 or 25 and the inside of the coupling. These orifices are formed by bores that are inclined toward the upper end of the coupling and inclined to the central axis of coupling 10 so that they flow in a spiral as shown. The orifices each have an inlet 23 and an outlet 24 that communicate with the inside of the coupling.

It will be noted that the lower pipe 18, the coupling 10, and the lower part of the pipe 17 are immersed in liquid and when compressed air from the source 16 is passed through the line 15 to the elbow 14 and channel 22 and thence through the orifices 21 into the inside of the coupling 10, the air entering the orifices 21 will be injected into the inside of the coupling in a spiral path. The convection current of the air in the liquid will reduce to gross specific gravity of the liquid and cause the air to rise and carry with it the liquid by induction and the forces generated by the dynamic head of the liquid.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A coupling for hollow tubing comprising,
   a hollow tubular body having a first end and a second end,
   means on each end of said body for attaching a pipe,
   an annular closed channel in said body extending around said body,
   connecting means for connecting a source of compressed air to said channel,
   and spaced bores in said body spaced around the inner periphery of said body connecting said channel with the hollow in said body,
   said bores extending from said channel toward said first end and inclined in circumferential direction whereby said air may be directed from said channel into said coupling in a spiral path,
   said coupling being constucted of a hollow cylindrical outside member,
   two cylindrical spaced spacers are eutectically joined and disposed in said outside member spaced from each other and sealingly engaging the inside surface of said outside member,
   and a hollow cylindrical central member is disposed inside said spacers,
   the outside peripheral surface of said central member being sealed to the inside periphery of said spacers,
   said central member, said spacers, and said outside member defining said annular closed channel.

2. The coupling recited in claim 1 wherein said central member terminates short of the ends of said outside member whereby the ends of said central member and the inner periphery of said spacers define a counterbore in each end of said coupling each adapted to receive an end of a pipe.

References Cited

UNITED STATES PATENTS

| | | | |
|---|---|---|---|
| 960,023 | 5/1910 | Knight | 103—232 |
| 1,314,539 | 9/1919 | Rust | 103—232 |
| 1,832,088 | 11/1931 | Boynton | 103—232 |
| 2,776,151 | 1/1957 | Harkenrider | 285—423 |
| 3,082,825 | 3/1963 | Hanner | 103—260 |
| 3,108,826 | 10/1963 | Black | 285—423 |

DONLEY J. STOCKING, *Primary Examiner.*

MARK M. NEWMAN, *Examiner.*

W. J. KRAUSS, *Assistant Examiner.*